United States Patent
Cone et al.

(10) Patent No.: US 7,068,258 B2
(45) Date of Patent: Jun. 27, 2006

(54) PORTABLE COMMUNICATION DEVICE WITH VIRTUAL IMAGE DISPLAY MODULE

(75) Inventors: George W. Cone, Sammamish, WA (US); Josh Hansen, Everett, WA (US)

(73) Assignee: eMagin Corporation, Hopewell Junction, NY (US)

( * ) Notice: Subject to any disclaimer, the term of this patent is extended or adjusted under 35 U.S.C. 154(b) by 654 days.

(21) Appl. No.: 09/849,745

(22) Filed: May 4, 2001

(65) Prior Publication Data

US 2001/0054988 A1    Dec. 27, 2001

Related U.S. Application Data

(60) Provisional application No. 60/203,714, filed on May 12, 2000.

(51) Int. Cl.
  *G09G 5/00*    (2006.01)
(52) U.S. Cl. ............... 345/169; 345/156; 345/7; 455/566; 455/575.4
(58) Field of Classification Search ......... 345/7–9, 345/156–173, 87; 455/556–557, 575, 566, 455/575.1, 575.2, 575.3, 575.4, 575.6, 575.8; 379/93.17, 93.19
See application file for complete search history.

(56) References Cited

U.S. PATENT DOCUMENTS

| 5,461,672 A | * | 10/1995 | Enokido et al. | ....... 379/433.02 |
|---|---|---|---|---|
| 5,485,318 A | | 1/1996 | Lebby et al. | |
| 5,633,762 A | | 5/1997 | Richard | |
| 5,969,698 A | | 10/1999 | Richard et al. | |
| 6,057,966 A | | 5/2000 | Carroll et al. | |
| 6,073,033 A | | 6/2000 | Campo | |
| 6,073,034 A | * | 6/2000 | Jacobsen et al. | ............ 455/566 |
| 6,137,525 A | * | 10/2000 | Lee et al. | ................ 348/14.02 |
| 6,181,304 B1 | | 1/2001 | Robinson et al. | |
| 6,275,714 B1 | * | 8/2001 | Kintz et al. | ................. 455/566 |
| 6,334,063 B1 | * | 12/2001 | Charlier et al. | ............. 455/566 |
| 6,360,104 B1 | * | 3/2002 | Budd et al. | ................ 455/566 |
| 6,452,577 B1 | * | 9/2002 | Gale et al. | .................... 345/87 |

* cited by examiner

*Primary Examiner*—Lun-Yi Lao
(74) *Attorney, Agent, or Firm*—Epstein Drangel Bazerman & James, L.L.P.

(57) ABSTRACT

A portable voice communication device such as a cellular telephone incorporates a virtual image display module so as to provide a virtual image of displayed information that is viewable while the user is communicating via the phone. The virtual image display module is movably mounted on a hand held frame so that it can be moved from a compact storage position to an extended in-use position. Moreover, a linkage between the virtual image display module and an earphone speaker module increases the distance between the two modules to accommodate a comfortable viewing distance when the earphone is positioned adjacent a user's ear.

6 Claims, 5 Drawing Sheets

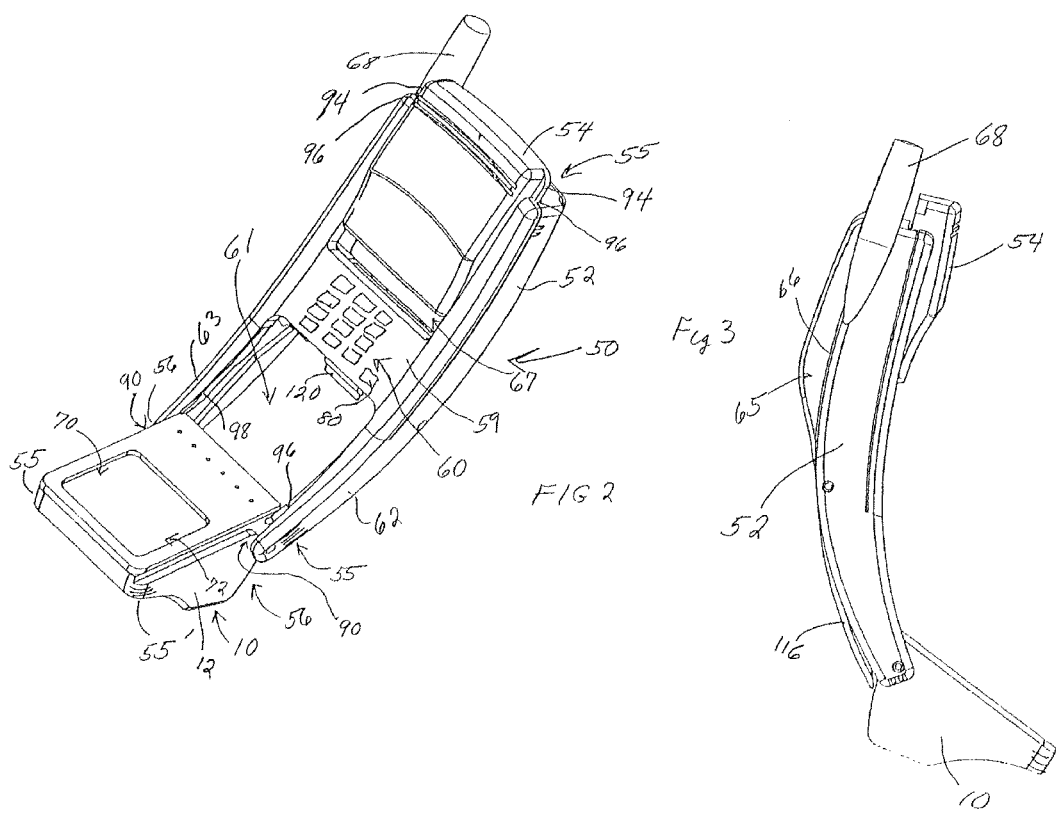

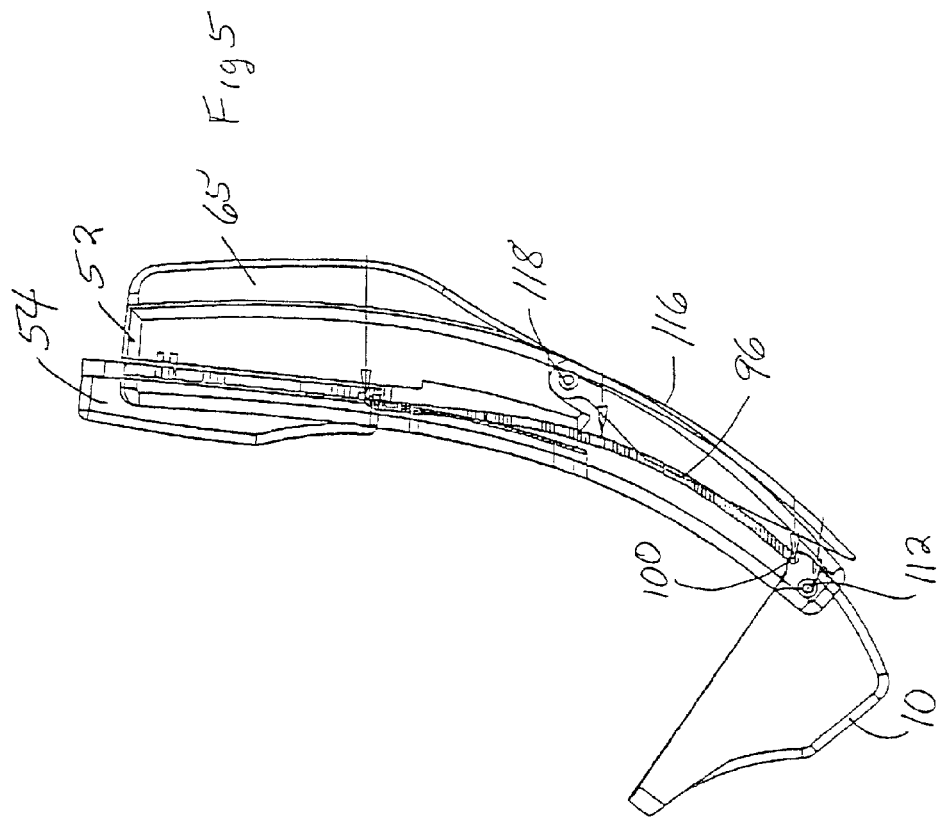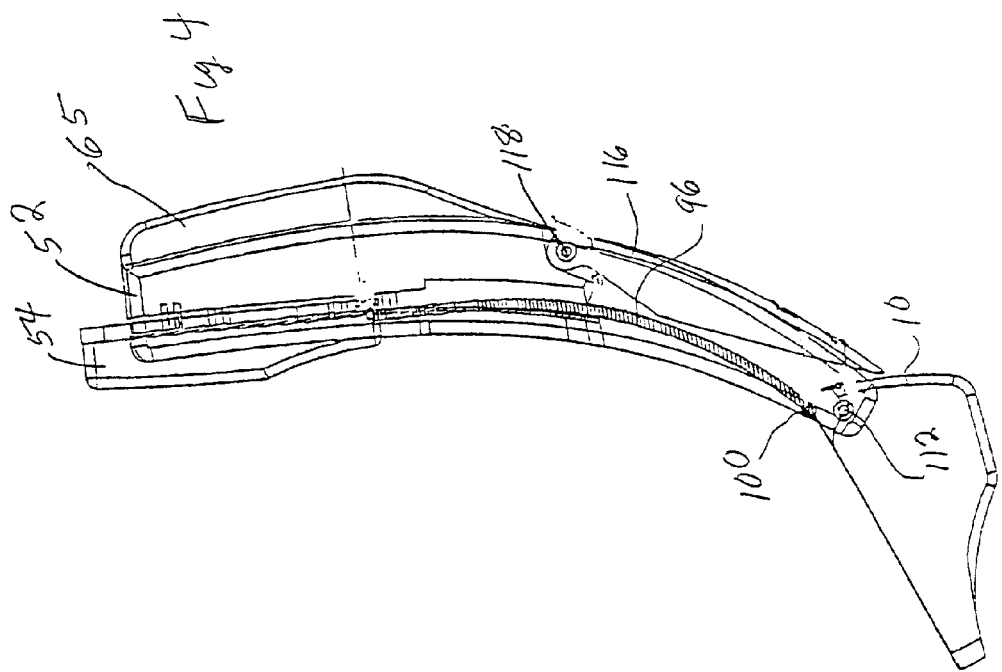

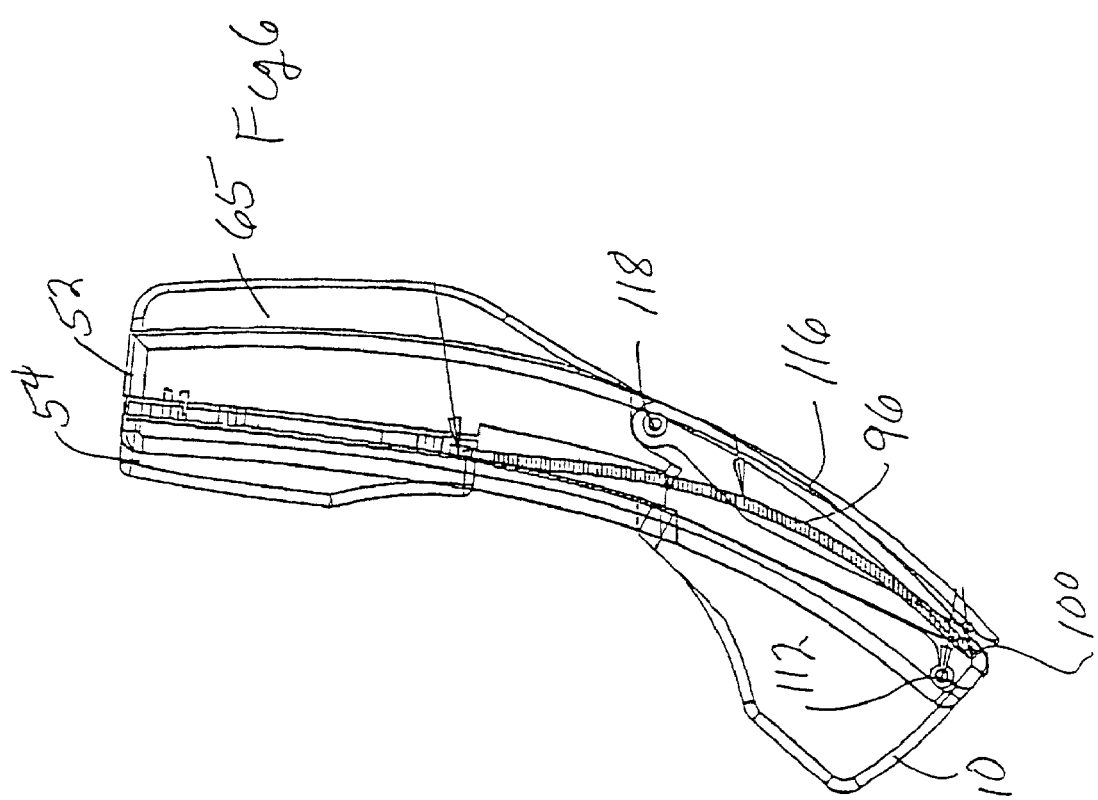

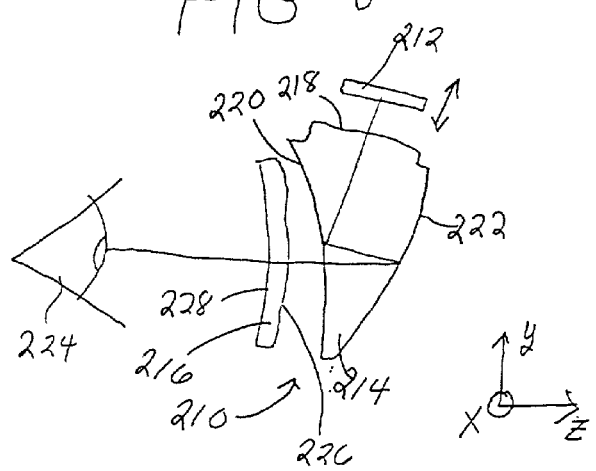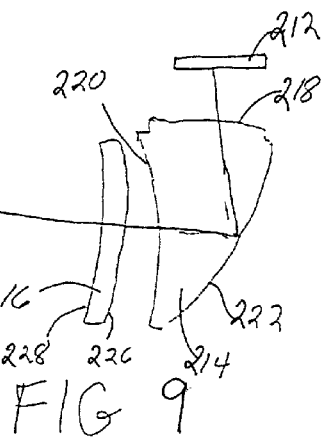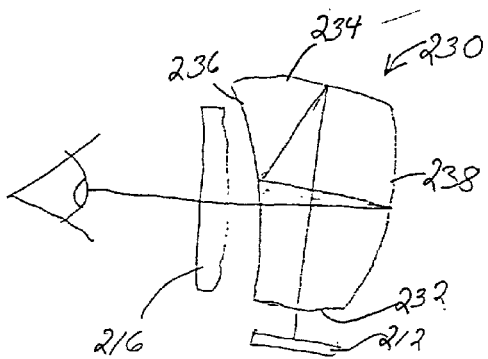

PORTABLE COMMUNICATION DEVICE WITH VIRTUAL IMAGE DISPLAY MODULE

CROSS-REFERENCE TO RELATED APPLICATIONS

This application claims the priority of provisional application Ser. No. 60/203,714 filed May 12, 2000 which is incorporated herein by reference.

STATEMENT REGARDING FEDERALLY SPONSORED RESEARCH OR DEVELOPMENT

N/A

1. Field of the Invention

The present invention relates to a portable communication device with a virtual image display module.

2. Background of the Invention

Head mounted display systems are known that include a frame to be worn on a user's head where the frame supports a display and an optical system that projects an enlarged virtual image of the information depicted on the display. An example of one such head mounted display system is shown in U.S. Pat. No. 6,181,304 B1. Virtual image display systems have also been incorporated into hand held devices such as cellular telephones and the like as well. Examples of such hand held systems are shown in U.S. Pat. Nos. 5,969,698; 5,633,762 and 5,485,318. The optics as well as the type of display employed in these virtual imaging systems typically varies from one application to another depending on the amount of information required to be displayed; variations in the resolution required (for example computer displays require greater resolution than movie video displays); the natural viewing distance of the virtual image for a particular application; and cost constraints associated with the application. Because different optical systems and displays are typically made for various applications, manufacturing costs for virtual imaging systems remain high.

BRIEF SUMMARY OF THE INVENTION

In accordance with the present invention, the disadvantages of prior virtual imaging systems have been overcome. In accordance with the present invention, a portable communication device incorporates a virtual image display module that is suitable for a wide range of applications including computer screen viewing.

The virtual image display module is mounted on the frame of the communication device for movement between a compact storage position that protects the optics of the module to an expanded in-use position. More particularly, when the device is opened for use, the distance between the display module, mounted on one end of the device frame or housing, and an earphone speaker, mounted on an opposite end of the frame is increased to accommodate a comfortable viewing distance when the earphone is positioned adjacent to a user's ear.

In accordance with another feature of the present invention, the device includes a switch designating a right eye position and a left eye position and a controller responsive to a change in the switch position to invert the image. This feature enables the device to be used with the earphone positioned adjacent the user's right ear and the image viewable by the user's right eye or with the earphone positioned adjacent the user's left ear and the image viewable by the user's left eye.

These and other advantages and novel features of the present invention, as well as details of an illustrated embodiment thereof, will be more fully understood from the following description and drawings.

BRIEF DESCRIPTION OF THE SEVERAL VIEWS OF THE DRAWING

FIG. 2 is a perspective view of the portable communication device of the present invention in the form of a cellular telephone incorporating a virtual image display module;

FIG. 3 is a side view of the cellular telephone of FIG. 2;

FIG. 4 is a cross-sectional side view of the cellular telephone in its fully open position;

FIG. 5 is a cross-sectional side view of the cellular telephone in a half-open position;

FIG. 6 is a side cross-sectional view of the cellular telephone in its closed or storage position;

FIG. 8 is a cross-sectional view of a second embodiment of the optical system of the virtual image display module;

FIG. 9 is a cross-sectional view of the optical system of FIG. 8 wherein the prism is operating in a single reflection mode; and FIG. 10 is a further embodiment of the optical system of the virtual image display module.

DETAILED DESCRIPTION OF THE INVENTION

Figure 1:
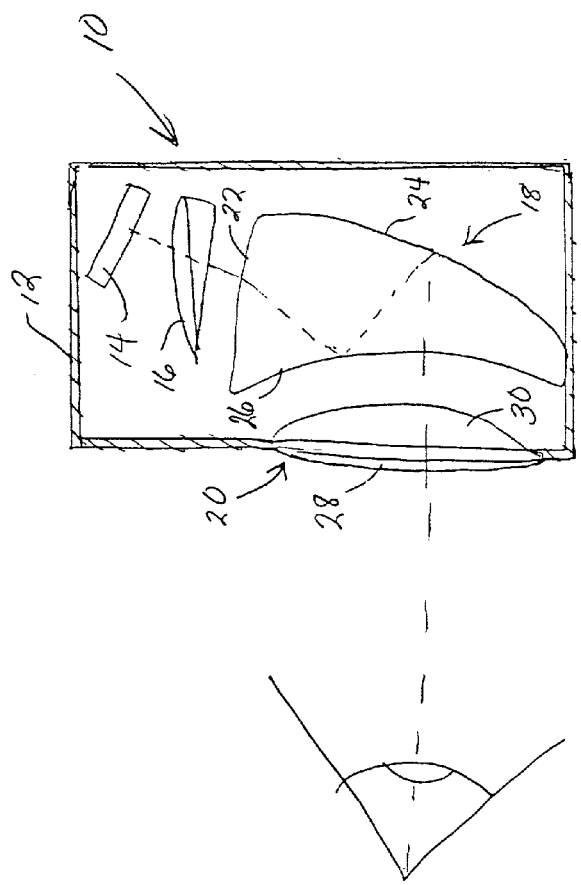
FIG. 1 is a side view of a first embodiment of the virtual image display module of the portable communication device of the present invention.

A virtual image display module 10 for use in the portable communication device of the present invention includes a housing 12, corrector lens 16, a prism optic 18 and an eyepiece lens 20 as shown in FIG. 1. The display 14 is preferably mounted in the housing 12 for movement towards and away from the corrector; whereas the corrector lens 16, prism optic 18 and eyepiece lens 20 are rigidly mounted in the housing 12. The display 14 may be a liquid crystal display. However, in a preferred embodiment, the display 14 is an OLED (organic light emitting display).

The corrector lens 16 pre-distorts the image of information depicted on the face of the display 14 so as to add distortions thereto that cancel the distortions generated by the rest of the optical train including the prism optic 18 and lens 20. The prism optic 18 has an entrance surface 22 receiving the pre-distorted image from the lens 16, a reflective or partially reflective surface 24 and an exit surface 26. In a preferred embodiment, the entrance surface 22 of the prism optic 18 is a plano surface. The reflective surface 24 of the optic 18 is preferably formed of a reflective coating although a partially reflective coating could also be used. The reflective surface 24 provides the primary amount of magnification power for the module to allow the size of the eyepiece lens 20 to be minimized. In a preferred embodiment, the surface 24 is shaped as an anamorphic asphere or a toroid. The exit surface 26 of the prism optic 18 is the surface through which light from the display 14 exits after being reflected by the reflective surface 24. The exit surface 26 has a slight negative curvature and is such as to reflect, via total internal reflection, light entering the surface 22 of the prism optic 18 to the reflective surface 24. The light from the display 14 is then reflected by the surface 24 through the exit surface 26 to the eyepiece lens 20. The eyepiece lens 20 preferably has a plano surface 28 forming the face of the display module 10 and an inner surface 30 with a positive curvature to add additional power to the system. The surface 30 of the lens 20 is positioned facing or adjacent the exit surface 26 of the prism optic. The surface 30 is preferably a spherical surface or it can be formed with a slightly aspheric surface.

The virtual image display module 10 is capable of generating extremely high resolution video images such as required for standard computer displays. When the user looks into the face of the display module 10 formed by the surface 28 of the lens 20, the user sees an enlarged image of the information depicted on the display 14 at a distance from the user which is much greater than the distance of the module 10 from the user's eye 32.

The virtual image display module 10 is incorporated into a portable, battery powered, wireless communication device 50, such as a cell-phone, to allow a user to view a virtual image of video information received via a wireless communication network. The communication device 50 as shown in FIGS. 2–6 includes a frame 52 for supporting an earphone speaker module 54 at one end 55 thereof and for supporting the video display module 10 at an opposite end 56 of the frame 52. A microphone 55 to pick up the user's voice is mounted on a first side 62 of the frame 52. The device 50 includes a second microphone 56 on a second side 63 of the frame as discussed below. An alternative location for mounting the microphones 55 and 56 is adjacent the outer corners of the display module 10 as depicted at 55' and 56'. The frame 52 includes a front wall 59 for mounting a keypad 60. The keypad 60 may be a typical telephone keypad or it may have fewer keys that operate as function keys if the device 50 has voice recognition capability. The communication device 50 is powered by a battery 65 mounted on a back wall 66 of the frame 52. It also includes and antenna 68 for reception.

A user positions the communication device 50 such that the earphone speaker 54 is adjacent the user's ear, as with a conventional telephone; but the end 56 of the phone 50 is raised so that instead of being positioned with respect to the user's mouth, the end 55 is positioned in the line of sight of one of the user's eyes so that the enlarged virtual image of the displayed video is seen. It is noted, that in this position, if the unit is held with the speaker 54 adjacent the user's right ear and the display module 10 positioned for viewing by user's right eye, the microphone 55 will be near the user's mouth so as to be able to pick up the user's voice clearly.

Most people are either right eye dominant or left eye dominant. A right eye dominant person has trouble viewing an image projected only in front of his left eye and similarly a left eye dominant person has trouble viewing an image projected only in front of his right eye. As such, a right eye dominant person will hold the cell-phone in his right hand with the phone speaker 54 aligned with his right ear and the display module 10 positioned so that it can be viewed by the user's right eye with the top of the displayed image being at position 70 and the bottom of the displayed image being at position 72. The microphone or voice pick up 55 is positioned adjacent the user's mouth and the microphone pick up 56 is disabled so as to prevent it from picking up spurious noise. When the cell-phone 50 is used by a left eye dominant person, the user holds the unit in his left hand with the phone speaker 54 adjacent his left ear and the face of the display module 10 in his left eye's line of sight so that the left eye can view the virtual image generated. In this position however, the image depicted on the display 14 must be inverted so that it appears to be the same when viewed via the left eye as when viewed by the user's right eye.

Figure 7:
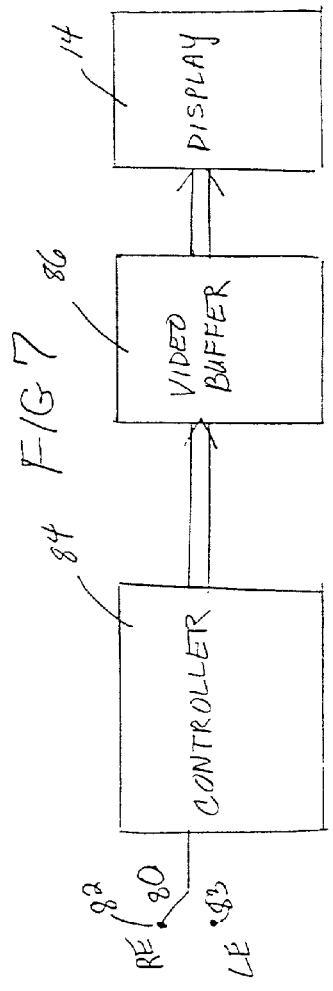
FIG. 7 is a block diagram of a system for inverting the displayed image so that the cell-phone can be used with either the user's right eye and ear or left eye and ear.

In order to invert the image on the display and to disable one of the microphones 55 or 56, the cell-phone 50 includes a switch 80 mounted on the frame 52 and movable between a right eye position 82 and a left eye position 83 as shown in FIG. 7. When the switch 80 is in the right eye position 82, the controller 84 which may include a microprocessor or the like, disables the microphone pickup 56, enables the pickup 55 and writes image data to be depicted on the display 14 into a video buffer 86 in a left to right and top to bottom manner or order so as to provide a bit mapped image of the image to be depicted on the display 14. With the switch 80 in the position 82, the controller reads the data out from the image buffer in the same manner in which the data was written into the buffer. When the switch 80 is moved to the left eye position 83, the controller 84 disables the microphone pickup 55, enables the pickup 56 and inverts the image either upon writing the image data into the buffer 86 or upon reading the image data out of the buffer 86 to the display 14.

More particularly, if the image data is to be inverted upon writing the data into the buffer 86, the controller 84 writes the data into the buffer from right to left and bottom to top which is opposite to the storage of the data when the switch 80 is in the right eye position 82 in which the data is written into the buffer 86 from left to right and top to bottom. In this embodiment the data is read out of the video buffer from left to right and top to bottom regardless of the position of the switch 80. The image depicted on the display 14 is thereby inverted so that the top of the displayed image is at position 72 and the bottom of the displayed image is at position 70. Thus, when the switch 80 is in the left eye position 83 and the image viewed by the user's left eye with the earphone adjacent to the user's left ear, the image appears in the correct orientation.

Alternatively, the controller 84 may be responsive to the switch 80 in the left eye position 83 by writing the image data into the video buffer 86 in the same manner as the data is written into the buffer when the switch 80 is in the right eye position 82 i.e. from left to right and top to bottom. However, in this embodiment, the data in the image buffer 86 is read out to the display 72 in the opposite manner when the switch 80 is in the left eye position 83 from the manner in which the data is read out when the switch 80 is in the right eye position 82. Specifically, the data would be read out from the video buffer 86, in this embodiment, with the switch 80 in the left eye position 83 from right to left and bottom to top.

In order to provide a compact unit when the communication device 50 is not in use, but to accommodate a comfortable distance between the user's eye and the display module 10 when the device is in use, the earphone speaker module 54 and the virtual image display module 10 are movably mounted on the frame 52 so as to increase the distance between these two modules 54 and 10 when in use as compared to their storage positions. More particularly, the video display module 10 includes a pivot mounting 90 located on a both sides of the module 10 near the bottom thereof. The pivotal mounting 90 of the display module 10 in the frame 52 allows the display unit 90 to be rotated from the open position depicted in FIGS. 2 and 4 into an aperture 61 formed in the frame to the compact closed position depicted in the FIG. 6.

The earphone speaker module 54 is slidably mounted in an aperture 67 of the frame 52 so that the module can be moved from an extended position shown in FIG. 2 to the storage position of FIG. 6. The earphone speaker module 54 includes a flange 94 disposed on both sides of the module 54 wherein the flange is carried in a channel 96 formed in both sides of the frame 52 defining the aperture 67.

The display module 10 and earphone speaker module 54 are connected by a pair of linkages 96, each linkage being connected to a side of the module 10 and a side of the module 54 near the bottoms thereof. Preferably, the connections of the linkage 96 to at least the module 10 are pivotal connections. The linkages 96 and 98 are such that when one of the modules 10 or 54 is manually moved from its storage position to its fully extended in-use position as shown in FIGS. 2 and 4, the linkage will move the other module to its in-use position. Similarly, as one of the modules is manually moved from its extended position as shown in FIG. 2 to its closed position shown in FIG. 6, the linkages 96 and 98 will move the other module to its closed or storage position.

As shown in FIG. 4, the linkage 96, 98 is a wire or a plate that has sufficient rigidity so as to move the modules, but that has some flexibility so as to allow the linkage 96 to bend slightly as it is moved between positions. When in the in-use position as shown in FIG. 4, the module 10 is open and the end 100 of the linkage attached to the module 10 is above the pivot point 112 of the pivot mounting 90. In the open position, the phone speaker 54 is such that it extends above the frame 52 of the phone. As the display module 10, for example, is manually rotated about the pivot 112, the end 100 connected to the display module moves from a position above the pivot 112 as shown in FIG. 4, downward as shown in the half-open position depicted in FIG. 5. With this downward movement of the end 100 of the linkage 96, 98, the linkage pulls the module 54 downward into the frame 52 as depicted in FIG. 5. When the display is rotated further to its storage position as depicted in FIG. 6, the end 100 of the linkage 96, 98 is below the pivot 112, the linkage 96 pulling the module 54 downward into its storage position so that the top surface of the speaker module 54 is flush with the top of the frame 52. Similarly, when the display module 10 is moved from the closed or storage position depicted in FIG. 6 to the inuse position depicted in FIGS. 2 or 4, the linkage 96, 98 push the module 54 such that the module 54 slides upward to its fully extended position. It is noted that the display module 10 will be automatically opened by the linkage 96, 98 if the user chooses to open the unit by manually sliding the module 54 from its storage position to its in-use position as well. Similarly, if the module 54 is manually moved to its storage position, the linkage will automatically close the display module by moving it to its storage position.

In order to protect the face of the display 10 and in particular, the eyepiece lens 20, the device 50 includes a back cover 116 as shown in FIG. 4. The back cover 116 includes a pivot mounting 118 on the frame 52 so as to accommodate the thickness of the display module 10 while providing a sleek, side profile for the cell-phone when the display module is in its storage position. As the display module 10 is pivoted from its in-use position to the storage position, the display module will pivot the back cover 116 slightly. A latch 120 as depicted in FIG. 2 engages an upper surface of the display module 10 so as to hold the module in its storage position.

It is noted that, depending upon the thickness of the image display module, the back cover of the frame need not be pivotable, but may be fixed. For example, the optical system of the embodiment depicted in FIG. 8 is extremely thin and can readily be accommodated in an aperture of the frame 52 having a one piece back wall construction that covers the optical system of the module 10 when it is not in use.

An optical system 210 used with an image source 212 in accordance with a second embodiment of the virtual image display module 10 as shown in FIG. 8 includes a prism 214 having positive power to provide an enlarged virtual image. The prism 214 may be used alone or in combination with a thin corrector lens 216. The image source 212 may be any type of image source including a display such as a liquid crystal display, a scanned image source, etc. Preferably, however, the image source 212 is a micro-display such as an OLED (Organic Light Emitting Device).

The surfaces of the prism 214 are formed so that the virtual image produced by the optical system 210 has minimal geometric distortion such as on the order of 5% or less. The prism surfaces are also selected to ensure that the optical system 210 delivers information with a sufficiently high MTF (Modulation Transfer Function) such that high contrast text in even small font sizes, such as 8 point font or 10 point font can be easily discerned across the entire virtual image. For example, the optical system 210 has a Modulation Transfer Function of 0.10 or higher at 20 line pairs with respect to a horizontal field of view greater than or equal to 25°. To accomplish this, the prism 214 preferably has balanced optical power with respect to each of the optical surfaces as well as with respect to the tangential and the sagittal ray propagation throughout the system as discussed in detail below. It is noted that the term optical surface as used herein refers to a surface that intersects a ray once. Therefore, a physical surface that intersects a ray, for example, twice is considered as two optical surfaces. By balancing the power among the optical surfaces of the prism, ray bending, which is a major contributor to geometric distortions and chromatic aberrations, is minimized.

As shown in FIGS. 8 and 9, the prism 214 has two transmissive surfaces 218 and 220 and a reflective surface 222. It is noted that, the term reflective surface, as used herein refers to a surface that is fully reflective or partially reflective as obtained by reflective coatings and partially reflective coatings respectfully. The prism 214 can operate in a single reflection mode as shown in FIG. 9. In this mode, light from the display 212 enters the prism via the entrance surface 218 and is reflected by the reflective surface 222 so that the light exits through the transmissive exit surface 220 where it is thereafter directed to the user's eye 224.

In a preferred embodiment, the prism 214 is used in a total internal reflection mode of operation as shown in FIG. 8. In this embodiment, light from the display 212 enters the prism 214 through an entrance surface 218 and intersects the transmissive surface 220 at the angle at which total internal reflection occurs for the material of the prism. The material of the prism 214 can be formed of a homogeneous material having an index of refraction n that is greater than or equal to 1 or the prism may be formed of different materials so as to comprise an achromat. In a preferred embodiment, the prism 214 is a homogeneous material, such as plastic, having an index of refraction in the range of 1.48–1.70. Light that is internally reflected by the surface 220 is directed towards the reflective surface 222 which in turn reflects the light back to the surface 220 so that the light passes therethrough, exiting the prism 214 towards the user's eye 224. In this embodiment, the entrance surface 218 is shaped as a rotationally asymmetric asphere so as to pre-distort the image in a manner that is more easily corrected than if the entrance surface of the prism was planar. The reflective surface 222 is a rotationally symmetric aspheric surface and the exit surface 220 is a rotationally asymmetric aspheric surface. Although in a preferred embodiment, each of the rotationally asymmetric aspheric surfaces 218 and 220 are anamorphic aspheric surfaces, other rotationally asymmetric aspheric surfaces may be employed as well such as a toroidal surface, a biconic surface, etc.

In a preferred embodiment, a thin corrector lens 216 is positioned between the prism 214 and the user's eye 224. The corrector lens 216 protects the total internal reflection surface 220 from contaminants and further provides subtle distortion correction. The corrector lens 216 has a surface 226 facing the prism 214 which is a rotationally asymmetric aspheric surface such as described above. The opposite surface 228 of the corrector lens 216 may be a planar surface or a surface with positive power. However, in a preferred embodiment, the surface 228 has negative power. When the optical system is employed in a see-through mode of operation such that the reflective surface 222 is formed of a partial reflector, the corrector lens 216 is formed with a total negative power that is equal and opposite to the power of the surface 222 so that the user's view of his environment through the optical system 210 is not distorted. Moreover, in the see-through mode, the housing 12 should be provided with an opening adjacent the partial reflector or a transparent back wall.

The optical power of the corrector lens is less than or equal to 30% of the optical power of the prism 214. Preferably, the corrector lens has a center thickness that is less than or equal to 3mm. Further, the corrector lens can be formed of a material having an index of refraction and dispersion qualities that are different from the index of refraction and dispersion qualities of the material forming the prism 214 so as to correct for chromatic aberrations. The corrector lens 216 may also include a liquid crystal material that modulates the brightness of the virtual image so as to accommodate variations in the ambient light so that the optical system can be used both indoors and outside. Further details of the optical system 210 are found in U.S. patent application Ser. No. 09/805,712, filed Mar. 13, 2001 which is incorporated herein by reference.

The prism 214 is not limited to three physical surfaces or three optical surfaces as depicted in FIGS. 8 and 9. An example of a prism having more surfaces is depicted in FIG. 10 for a prism 230. In this embodiment, light from the display 212 enters the prism 230 through a transmissive entrance surface 232. The light from the entrance surface 232 is reflected by the opposite reflective surface 234 which reflects the light to an adjacent transmissive surface 236 at the angle that is necessary for total internal reflection. After being reflected by the transmissive surface 236, the light is reflected by a reflector 238 back to the transmissive surface 236 so that the light exits the prism 230 therethrough. After exiting the prism, the light passes through the corrector lens 216 to the user's eye. As shown in FIG. 10, the path segments of the optical path through the prism 230 extend between opposite optical surfaces except for the path segment between adjacent optical surfaces 234 and 236. Because the path of a given ray of light through the prism 230 has a greater number of segments extending between opposite optical surfaces than extending between adjacent optical surfaces, the optical element 214 has minimal complex optical distortions that must be corrected.

Many modifications and variations of the present invention are possible in light of the above teachings. For example, although the portable communication device is depicted as a cellular telephone, it may take other forms as well. Thus, it is to be understood that, within the scope of the appended claims, the invention may be practiced otherwise than as described hereinabove.

The invention claimed is:

1. A portable communication device with a virtual image display, comprising: a hand held frame having a first end and a second, opposite end; an earphone speaker for projecting sound mounted in the first end of the frame; a virtual image display system including a display and at least one optic through which a user looks to view an enlarged virtual image of information depicted on the display, the virtual image display system being mounted in the second end of the frame wherein both the earphone speaker and the virtual image display system are mounted on the frame for movement to increase the distance between the earphone speaker and the optic through which the user looks to view the image when the device is in use; a switch mounted on the device, the switch having a right position and a left position; a controller responsive to the switch being moved from the right position to the left position to invert the image depicted on the display so that the top of the image is adjacent to a first side of the frame when the switch is in the right position and the top of the image is adjacent to a second side of the frame when the switch is in the left position; and a first microphone mounted on the first side of the device and a second microphone mounted on the second side of the device, said controller being responsive to the switch being in the right position to disable the first microphone and enable the second microphone and the controller being responsive to the switch being in the left position to disable the second niicroplione and enable the first microphone.

2. A portable communication device with a virtual image display, comprising: a hand held frame having a first end and an opposite, second end and a first side and an opposite, second side; an earphone speaker for projecting sound mounted in the first end of the frame; a virtual image display system having a display depicting an image and at least one optic into which the user looks to view a virtual image, the optic being located at the second end of the frame; a switch having a right position and left position; and a controller responsive to the switch being moved from the right position to the left position to invert the image depicted on the display so that the top of the image is adjacent a first side of the frame when the switch is in the right position and the top of the image is adjacent the second side of the frame when the switch is in the left position, further including a first microphone mounted on the first side of the device and a second microphone mounted on the second side of the device, said controller being responsive to a switch being in the right position to disable the first microphone and enable the second microphone and the controller being responsive to the switch being in the left position to disable the second microphone and enable the first microphone.

3. A portable communication device as recited in claim 2 wherein said first and second microphones are respectively mounted on the first and second sides of the frame.

4. A portable communication device as recited in claim 2 wherein said virtual image display system is mounted in a module housing coupled to the second end of the frame and said first and second microphones are respectively mounted on the first and second sides of the module housing.

5. A portable communication device as recited in claim 3 wherein said module housing is pivotally mounted on the second end of the frame to allow the virtual image display system to be moved from an in-use position to a storage position.

6. A portable communication device as recited in claim 5 wherein a surface of said frame covers the optic when the module housing is in its storage position.

* * * * *